United States Patent

[11] 3,613,718

| [72] | Inventor | J. R. Ballinger<br>Setauket, N.Y. |
|---|---|---|
| [21] | Appl. No. | 884,303 |
| [22] | Filed | Dec. 11, 1969 |
| [45] | Patented | Oct. 19, 1971 |
| [73] | Assignee | All-O-Matic Manufacturing Corporation<br>New Hyde Park, N.Y. |

[54] PRESSURE-VACUUM CONTROL VALVE
18 Claims, 8 Drawing Figs.
[52] U.S. Cl. .................................................... 137/493
[51] Int. Cl. ...................................................... F16k 17/18
[50] Field of Search ....................................... 137/493.6,
493.3, 493.8, 493.9, 512.2, 514.7, 526, 529, 541,
493, 624.14; 251/120; 220/44

[56] References Cited
UNITED STATES PATENTS

| 1,156,657 | 10/1915 | Beam | 137/493 X |
|---|---|---|---|
| 1,229,885 | 6/1917 | Chadwick | 137/493.6 X |
| 2,310,516 | 2/1943 | Clark | 251/120 X |
| 2,571,667 | 10/1951 | Bondurant | 137/493 X |
| 2,775,868 | 1/1957 | Trevaskis | 137/541 X |
| 3,108,610 | 10/1963 | De See | 137/493 |

Primary Examiner—M. Cary Nelson
Assistant Examiner—Robert J. Miller
Attorney—James & Franklin ABSTRACT: A pressure-vacuum control valve system, particularly for use in sealing hydrocarbon fuel containers, for equalizing the pressure within and without such a container by controlling air and fuel venting, comprises telescoping valve members defining a single seat valve adapted to vent fluid in both directions. A restriction adjacent the single valve seat is adopted to inhibit the venting of large quantities of fuel during short periods of tank pressure increase by lowering the pressure adjacent said valve seat in response to flow through said restriction. A time lag in valve actuation is provided by the free travel of said valve members in at least one direction, said free travel also providing momentum to assist the subsequent valve actuation.

PATENTED OCT 19 1971 3,613,718

INVENTOR
J. R. BALLINGER

BY James and Franklin
ATTORNEY

INVENTOR
J. R. BALLINGER
BY James and Franklin
ATTORNEY

PRESSURE-VACUUM CONTROL VALVE

The present invention relates to a pressure-vacuum control valve system for sealing a fluid-filled tank while permitting some venting of fluid in response to a pressure differential across the valve. The control valve is disclosed specifically in connection with the sealing of hydrocarbon fuel containers, such as automobile and truck fuel tanks for the purpose of controlling the air and/or air fuel vapor venting of such containers. However, it will be apparent that the invention will be useful in any application requiring the maintenance of a substantially equalized pressure on either side of a valve with a minimum of fluid flow therethrough.

The problem of air pollution has risen to immense proportions in recent years. A primary contributor to air pollution in large urban centers is the automobile. In addition to exhaust fumes emanating from vehicle tailpipes, it has been found that the venting of fuel vapor from automobile and truck gas caps results in a hydrocarbon vapor contamination of the atmosphere which contributes significantly to the total air pollution of our cities. The Federal Government has recognized this source of air pollution by providing atmospheric antipollution specification requirements for controlling the flow of hydrocarbon vapor contamination into the atmosphere from said fuel containers. The control valve system of the present invention is designed to meet those Federal requirements.

Hydrocarbon fuel containers of all types require some valve system incorporated within their closure members so as to prevent explosion or implosion due to pressure differentials which may result from a change in temperature, atmospheric pressure, or sudden agitation. This problem is particularly acute in vehicle fuel tanks where the vehicle is adapted to accelerate and decelerate rapidly. Sudden acceleration or braking of a vehicle generally results in large localized pressure differentials within the fuel tank and between the tank and atmosphere adjacent the gas cap.

Prior art pressure-vacuum gas caps are adapted to vent air, fuel or fuel vapor to the atmosphere or conversely to allow atmospheric air to flow into the tank in response to an increase or decrease in relative tank pressure, respectively. A particular disadvantage of such devices is that they are immediately responsive to momentary changes in pressure and thus allow considerably more venting than is necessary to maintain the pressure in the tank, in relation to the atmospheric pressure, at a safe level. Moreover, when these momentary pressure changes are the result of localized conditions created by the momentary shifting of fluid within the tank rather than an overall change in volume or temperature, the resulting venting is self-perpetuating. For example, if the pressure on the tank side of the gas cap momentarily increases as a result of vehicle acceleration, fuel or fuel vapor will be immediately vented to atmosphere thereby reducing the total volume of fluid in the tank. When the fluid is subsequently redistributed and the pressure equalized within the tank, the tank pressure will be lowered by an amount corresponding to the lower volume of fluid. This lower overall tank pressure will again actuate the control valve to allow venting of air into the tank to reestablish the pressure therein at a level equal to atmosphere. For normal stop-and-go city driving this results in a large volume of fuel vapor venting to the atmosphere, contributing to the already critical air pollution problem, and a corresponding venting of air to the tank, with the possibility of introducing impurities therein. For large sudden accelerations or braking, such as those encountered continually in racing and occasionally in normal high-speed highway driving, conventional gas caps generally permit the loss of large quantities of fuel both in the form of liquid and vapor in response to the pressure differentials resulting from agitation. In addition to the obvious reduction of fuel economy, this venting may produce an unsafe situation both with regard to the possible fire hazard and the resulting slippery road condition.

It is a primary object of the present invention to provide a pressure-vacuum control valve for fuel containers adapted to maintain the fuel tank pressure at a safe level and at the same time provide a minimum of fuel, air, and fuel vapor venting through said valve.

It is another object of the present invention to provide a pressure-vacuum control valve for use in fuel tank caps, which is safe and dependable in operation and incorporates structure designed to overcome static friction between the valve surfaces and thus prevent sticking.

It is a further object of the present invention to design a pressure-vacuum control valve for use in vehicle fuel tanks which incorporates an automatic time delay for the actuation of said valve to filter out momentary pressure changes and thus prevent unnecessary venting.

It is still a further object of the present invention to design a pressure-vacuum control for use in vehicle fuel tanks which valve incorporates an automatic fuel cutoff to prevent excessive liquid fuel venting in response to sudden pressure changes of short duration.

To the accomplishment of the above the present invention comprises a pressure-vacuum control valve system in which two valve members are arranged in slidable telescopic relationship. Said members are biased to a position in which a single valve seat closes off flow through the valve. Said members are adapted to slide relatively to each other in response to a differential in pressure across said valve to permit the venting of fluid through said valve. A restriction is provided on the tank side of said control valve for reducing the fluid pressure adjacent the tank side of the single valve seat upon the flow of fluid, and particularly liquid fluid, therethrough, thus producing an oscillatory movement of said seat for venting fuel only in small increments. Both valve members are adapted initially to move together in free travel in response to the development of a vacuum or negative pressure on the tank side of the valve. A stop member is provided on one of the valve members for stopping such member after a given amount of free travel, the momentum of the other member assisting in the opening of the valve seat against the static friction between the two telescoping members. Finally, a fuel cutoff member is adapted to prevent excessive fuel flow from the tank in response to large sudden localized pressure increases therein, such as may be encountered upon sudden acceleration of the vehicle.

To the accomplishment of the above, and to such other objects as may hereinafter appear, the present invention relates to a pressure-vacuum control valve system, as defined in the appended claims and as described in this specification, having reference to the accompanying drawings, in which:

Figure 1:
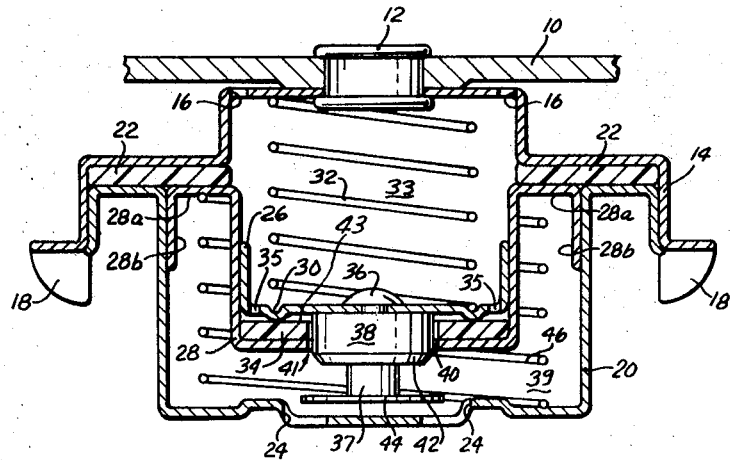
FIG. 1 is a cross-sectional side elevation of the control valve of the present invention shown biased to its normal position, the fuel tank being below and atmosphere being above the valve as shown.

Referring specifically to the drawings, the control valve system of the present invention is illustrated in Fig. 1 in its normal position in the absence of a significant pressure differential between the inside and the outside of the tank. The supporting structure shown is generally designed as a closure member or gas cap for a vehicle fuel tank. Support member 10, shown in fragmentary view, may form part of a handle for opening or closing the cap. Secured to support member 10 by rivet 12 is a locking cup 14 of a standard type used generally on pressure-vacuum gas caps found on American and foreign automobiles. Locking cup 14 is provided with vent holes 16 for the passage of fuel, fuel vapor, or air as will be hereinafter described. As is conventional locking cup 14 is provided with locking cam 18 designed to lock the cap onto the filler neck of a gas tank (not shown) when inserted thereon in registration with notches extending therefrom and turned. The remainder of the support structure consists of support cup 20 designed to be fitted on to locking cup 14 in sealing engagement with gasket 22. Support cup 20 likewise is provided with vent holes 24 for permitting fluid flow through the control valve.

The valve structure of the present invention comprises a generally U-shaped valve member 26 (hereinafter referred to as the positive pressure valve), telescopingly positioned within a second generally U-shaped valve member 28 (hereinafter referred to as the vacuum-pressure valve) having outwardly and downwardly extending flange members 28a and 28b respectively. Formed on positive pressure valve 26 is a single annular valve seat 30 biased by coil spring 32 against an annular gasket 34 which rests on the inner surface of vacuum-pressure valve 28.

It can be seen that positive pressure valve 26, together with locking cup 14 define a chamber 33 in communication with the atmosphere through apertures 16 in locking cup 14. Positive pressure valve 26 is provided with vent holes 35 which provide fluid communication between chamber 33 and one side (hereinafter referred to as the ambient side) of valve seat 30. Vacuum pressure valve 28 together with support cup 20 define a chamber 39 in fluid communication with the inside of the fuel tank through apertures 24. Secured to positive pressure valve 26 by headed upward extension 36 and extending downwardly therefrom is fuel leakage check valve 38. In its normal position as shown in Fig. 1, check valve 38 is received within an aperture 40 in vacuum pressure valve 28, the aperture 40 being of a slightly greater diameter than said valve 38, thus forming an annular restriction or orifice 41 therebetween providing fluid communication between chamber 39 and a chamber 43 defined between orifice 41 and valve seat 30. The cross-sectional area of the flow path through restriction 41 is much smaller than the cross-sectional flow area through apertures 16, 24 and 35 and is thus adapted to provide a significant pressure drop thereacross. Check valve 38 is formed with a bevelled surface 42 at its lower end, the significance of which will hereinafter be explained. A disk-shaped member 44 is attached to the lower end of part 37 extending downwardly from valve 38 and serves both as a fuel cutoff device and a stop member as will hereinafter be described.

The entire valve apparatus (e.g., both valve members 26 and 28) is normally biased upwardly to the position shown in Fig. 1 by coil spring 46. In the position illustrated, the flanged portion 28a of vacuum-pressure valve 28 is urged against gasket 22 and is flush with the flanged portion of locking cup 20. The outer surface of flanged portion 28b is in slidable relationship with the inner surface of locking cup 20.

OPERATION

It is apparent that in the absence of a significant fluid pressure differential across the valve, single valve seat 30 is adapted by engagement with gasket 34 and by virtue of the bias of coil springs 32 and 46 to close off fluid flow through the valve system and thus prevent fuel in the form of liquid or vapor from escaping from the tank and atmospheric air including possible harmful impurities from entering the tank.

VACUUM PRESSURE VALVE

Figure 2:
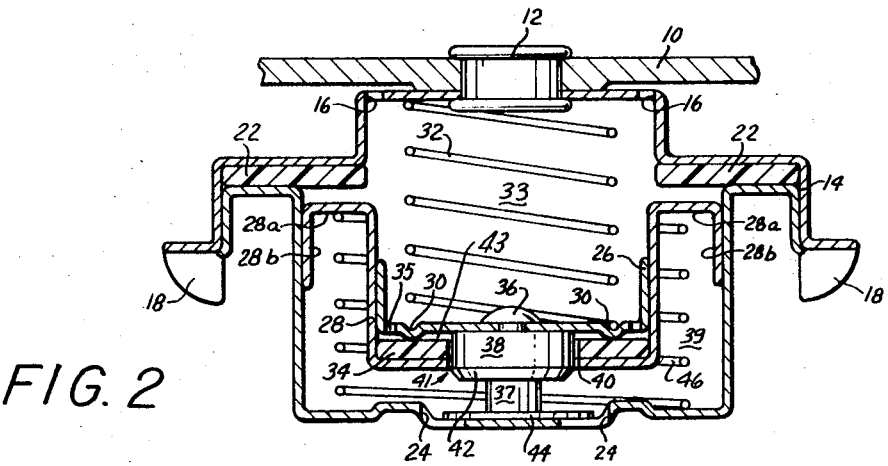
FIG. 2 is a cross-sectional side elevation of the control valve at the end of its free travel stroke in response to a vacuum or negative pressure within the tank, but before the valve seat has opened.

Upon the sudden flow of fuel from the tank to the vehicle engine or upon the sudden shifting of fuel away from the portion of the tank adjacent the filler cap, vacuum or reduction in pressure may be created on the tank side of the gas cap. By virtue of apertures 24 and 16 there will be a resulting fluid pressure drop in chamber 39 relative to chamber 33. Said pressure differential will cause vacuum pressure valve 28 to slide downwardly within support cup 20 against the bias of spring 46. The spring constants and normal compression position of coil springs 46 and 32 are chosen such that spring 32 will maintain valve seat 30 closed against gasket 34 until no further movement or free travel of vacuum pressure valve 28 is possible. As shown in Fig. 2, this will occur when disk 44 comes in contact with support cup 20. Disk 44 thus serves as a stop member for defining the downward free travel of valve members 26 and 28. If the vacuum created in the tank side of the valve is of very short duration, it will have disappeared by the time valve numbers 26 and 28 have completed the free travel stroke. Spring 46 will accordingly return the valve members back to the normal position shown in Fig. 1. Thus, for momentary localized pressure drops due to mere shifting of fuel within the tank, the time delay resulting from the free travel stroke will prevent the valve seat from opening and thus prevent the unnecessary flow of air, and possibly harmful impurities, into the tank. More importantly, since no air is allowed into the tank a subsequent venting of air and fuel vapor to atmosphere as a result of the increased volume in the tank, as previously described is prevented.

If, however, the pressure decrease within the tank is of a longer duration, as where fuel is rapidly and steadily being drawn from the tank for a significant period of time, venting to the tank is necessary to maintain the pressure therein at a level reasonably close to that of atmosphere. The control valve of the present invention is designed to provide such venting when a pressure decrease within the tank continues. Having reached the position shown in Fig. 2, positive pressure valve 26 is prevented from further downward travel by the engagement of disk 44 against support cup 20. If the pressure differential between chambers 33 and 39 continues or increases it will now be effective to move gasket 34 carried by vacuum-pressure valve 28 out of sealing engagement with valve seat 30. As can be seen from Fig. 2, the fluid pressure bearing on gasket 34 on the ambient side of valve seat 30 will, by virtue of apertures 35, be equal to atmosphere while the underside of vacuum-pressure valve 28 is at tank pressure. A small net downward force is thus exerted on vacuum-pressure valve 28 against the bias of spring 46. The primary moving force, however, is due to this same pressure differential over the greater area of the flanged portion 28a of vacuum-pressure valve 28. As can be seen from Fig. 2, the upper surface of this flanged portion 28a is now spaced from gasket 22 and in contact with chamber 33 (e.g., atmospheric pressure). Thus, a significant net downward force will urge vacuum-pressure valve 28 downwardly against the bias of coil spring 46.

Besides providing a time delay in valve actuation which filters out momentary pressure changes as previously described, the free travel stroke of valve members 26 and 28 provides another significant advantage to the operation of the control valve. In conventional valve mechanisms utilizing slidable valve members, the initial actuating pressure must overcome the static friction between the slidable members and must provide an acceleration to overcome the inertia of the initially stationary valve member. It will be apparent that the control valve of the present invention eliminates both of these factors at the point of valve actuation subsequent to the free travel stroke. Vacuum-pressure valve 28 need not accelerate to move away from positive pressure valve 26, but rather it continues its downward movement while positive pressure valve 26 is held stationary (e.g., decelerated to zero relative to support cup 20) by the engagement of disk 44 on support cup 20. Moreover, the resulting downward momentum of vacuum-pressure valve 28 assists in overcoming the static friction between its inner surface and the outer surface of positive pressure valve 26.

Figure 3:
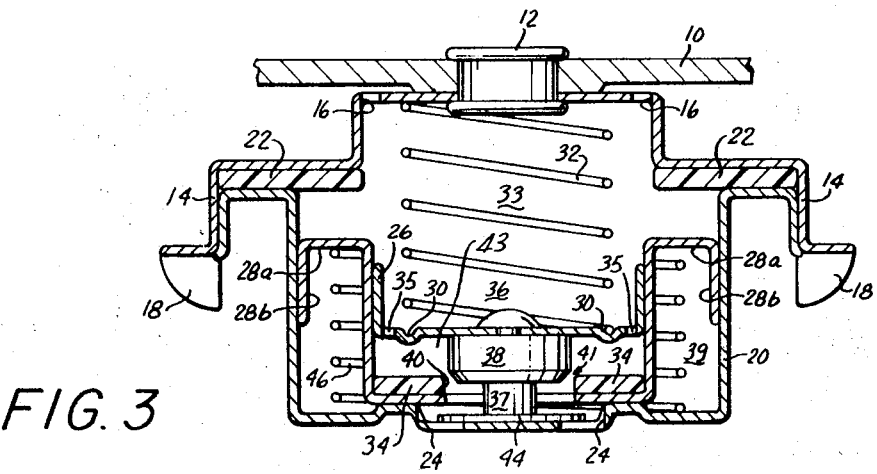
FIG. 3 is a cross-sectional side elevation of the control valve of Fig. 2 after the valve seat has opened to allow the passage of atmospheric air into the tank.

Fig. 3 shows vacuum-pressure valve 28 in its fully opened position. It can be seen that restriction 41 has been progressively widened along its length by virtue of bevelled surface 42 on check valve 38. This allows for increased venting of air to the tank for large pressure drops therein.

POSITIVE PRESSURE VALVE

The mode of operation for venting fuel, air, or fuel vapor to atmosphere will now be described. Upon the sudden momentary increase in fluid pressure within the fuel tank a pressure differential is established on opposite sides of positive pressure valve 26 inwardly of valve seat 30 by means of apertures 16 and 24, and orifice 41. There is thus a net upward force on positive pressure valve 26 which urges said valve to slide upwardly away from vacuum-pressure valve 28. Consequently, the valve seat 30 is moved from gasket 34, thereby establishing a flow path for the venting of fuel to atmosphere. The dimensions of check valve 38 and aperture 40 are such that the restriction 41 defined by the clearance therebetween presents a very small flow area as compared to apertures 24, 35 and 16. Thus, as fuel begins to flow through restriction 41 there is created, according to the laws of fluid flow, a pressure drop across such restriction (e.g., from chamber 39 to chamber 43. Moreover, it will be apparent that as valve member 26 moves upwardly the volume of chamber 43 increases rapidly resulting in an additional pressure drop in chamber 43. Accordingly, the pressure exerted on positive pressure valve 26 downstream of restriction 41 and adjacent to the tank side of valve seat 30 is significantly reduced as valve seat 30 is lifted from gasket 34. Such pressure reduction is sufficient to reduce the net upward force exerted on positive pressure valve 26 to an extent allowing coil spring 32 to return said positive pressure valve and valve seat 30 to its sealing position against gasket 34. It will be apparent that for momentary tank pressure increases the aforementioned process will be sufficient to provide the necessary momentary pressure relief with a minimum of fuel loss. This mode of operation accordingly will occur whenever there is a sudden but momentary shift of fuel within the tank which creates such a momentary pressure increase therein. If the tank pressure increase is of a more sustained nature, as where there is an expansion of fuel vapor as a result of a temperature increase, positive pressure valve 26 after having returned to its sealing position will again be urged by the continuing pressure differential upwardly out of sealing engagement with gasket 34 whereupon the same pressure will again return it to its sealing position. As a result, for moderate but sustained pressure increases within the fuel tank, the opening and closing of valve seat 30 will occur continuously and repeatedly, resulting in an incremental venting of fuel to atmosphere. Thus, while the pressure within the tank continues to be relieved by such venting the process insures against overcompensation in the form of a venting of a large quantity of fuel.

Of course, a sustained tank pressure increase may be of such magnitude as to overcome the effects of restriction 41, In such a case, positive pressure valve 26 will continue to be urged upwardly despite the pressure drop through restriction 41, thereby allowing large quantities of fuel to be vented to atmosphere. It will be apparent that the bevelled surface 42 of check valve 38 here again comes into play by progressively widening restriction 41 to allow the venting of a larger volume of fuel vapor at low Reynolds number with laminar flow through the valve. This flow characteristic is desirable because it prevents throttling conditions from turbulent flow and renders the system less susceptible to malfunction by contamination from dust and moisture. During this mode of operation, the problem of overcompensation will again become acute. Accordingly, I have provided the fuel cutoff disk 44 carried on part 37 which is adapted to completely cut off the flow of fuel when positive pressure valve 26 reaches the predetermined position in its upward travel in response to sudden large pressure increases within the fuel tank.

Figure 5:
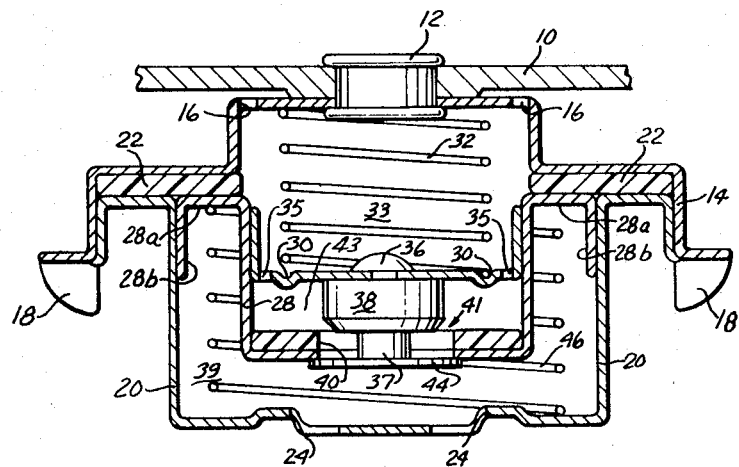
FIG. 5 is a cross-sectional side elevation of the control valve with the valve seat in its maximum open position, the fuel flow cutoff valve having completely cutoff fuel flow in response to a sudden increase in tank pressure.

FIG. 5 shows disk 44 in its cutoff position. It will remain in that position until the tank pressure is reduced to an extent allowing coil spring 32 to return positive pressure valve 26 to its normal position.

Figure 6:
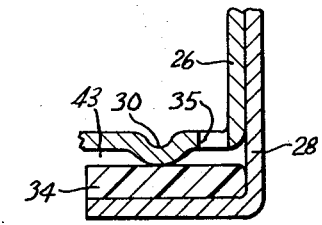
FIG. 6 is an enlarged fragmentary view of the valve seat and seal arrangement in the position shown in Fig. 1.
Figure 7:
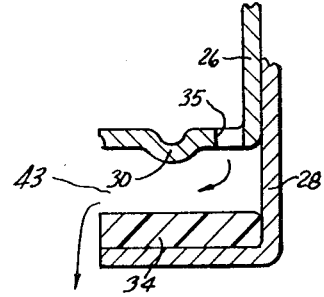
FIG. 7 is an enlarged fragmentary view of the valve seat and seal arrangement in the position shown in Fig. 3.
Figure 8:
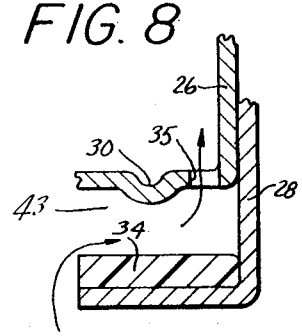
FIG. 8 is an enlarged fragmentary view of the valve seat and seal arrangement in the position shown in Fig. 4.
Figure 4:
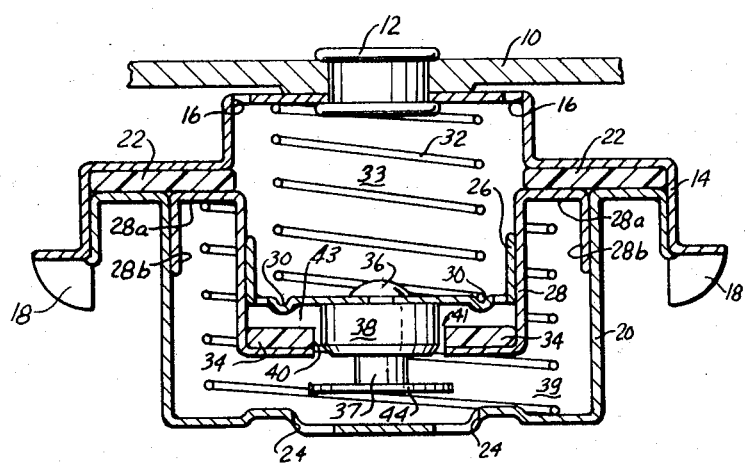
FIG. 4 is a cross-sectional side elevation of the valve showing the valve seat slightly open in response to an increase in tank pressure.

The two-way operation of my control valve is illustrated schematically in FIGS. 6–8. Starting from its normal position (FIG. 6), it can be seen that in response to a decrease in tank pressure gasket 34 carried by vacuum-pressure valve 28 is urged downwardly with respect to valve seat 30 allowing air to flow into the tank. If on the other hand the fluid pressure in the tank is increased relative to atmosphere, valve seat 30 carried by positive pressure valve 26 is urged upwardly relative to gasket 34 allowing air, fuel or fuel vapor to be vented from the tank to atmosphere.

The control valve of the present invention provides a safe and reliable means of maintaining the pressure of a fuel tank at a level close to that of atmosphere, while at the same time allowing only a minimum of fluid to pass in either direction between the tank and atmosphere. The simplicity of the overall design permits very low manufacturing costs and allows the valve system to be readily incorporated into standard vented gas caps.

While the invention has been described with specific regard to vehicle gas caps it is equally applicable to stationary fuel containers, such as gasoline fuel station pump tanks, farm and construction equipment fuel storage tanks and indeed all fluid containers which require controlled venting to atmosphere.

While only a single embodiment of this invention has been herein specifically disclosed, it will be apparent that variations may be made thereto without departing from the spirit and scope of the invention as defined in the appended claims.

1. A control valve for maintaining the pressure of a fluid on one side of said valve substantially at the same level as the pressure of the fluid on the other side of said valve, comprising first and second valve members communicating respectively with the fluid on opposite sides of said valve and defining a path for the flow of fluid through said valve from one side to the other side of said valve, means operatively connected to said first and second valve members and engaging for normally sealing off said flow path to prevent the flow of fluid through said valve and adapted to open said flow path in response to an increase in pressure on said one side of said engagement of said sealing means relative to the other side of said engagement of said sealing means, means defining a restriction in said flow path opening into a chamber larger in cross section than said restriction defined between said first and second valve members on said one side of said sealing means, said restriction and chamber being effective upon the flow of fluid therethrough to create a pressure drop in said chamber on said one side of said sealing means, thereby to reduce the fluid pressure on said one side of said sealing means.

2. The control valve of claim 1, further comprising said valve members being mounted for relative movement, and means normally biasing said valve members to a first position relative to each other and effective to seal off said flow path, said valve members being adapted, in response to an increase in fluid pressure on said one side of said valve relative to the fluid pressure on the other side of said valve, to have relative movement to a second relative position effective to open said flow path.

3. The control valve of claim 2, wherein said biasing means comprises first and second spring means adapted respectively to bias said first and second valve members in opposite directions.

4. The control valve of claim 2, wherein said sealing means comprises a single valve seat on one of said valve members and sealingly engaged by the other of said valve member.

5. The control valve of claim 4, wherein said sealing means further comprises gasket means carried by the other of said valve members and wherein said single valve seat in its normal position bears on said gasket means, thereby closing said flow path.

6. The control valve of claim 2, wherein said means for defining said flow path includes aperture means in at least said first valve member, said restriction being defined at least in part by said aperture means.

7. The control valve of clam 6 further comprising means for increasing the cross-sectional flow area of said restriction as said first and second valve members move away from each other.

8. The control valve of claim 2 further comprising fluid cutoff means adapted to cut off the flow of fluid through said valve when said first and second valve members move away from each other, a predetermined distance.

9. The control valve of claim 1 wherein said means for defining said flow path includes aperture means in at least said first valve member, said restriction being defined at least in part by said aperture means.

10. The control valve of claim 2, in which said chamber is defined in part by a movable valve member, said member in moving from said first to said second position causing said chamber to enlarge, thereby further to reduce the fluid pressure on said one side of said sealing means.

11. A control valve for maintaining the pressure of a fluid on one side of said valve substantially at the same level as the pressure of the fluid on the other side of said valve, comprising first and second valve members communicating respectively with the fluid on opposite sides of said valve and defining a path for the flow of fluid through said valve from one side to the other side of said valve, means operatively connected to said first and second valve members for normally sealing off said flow path to prevent the flow of fluid through said valve and adapted to open said flow path in response to an increase in pressure on one side of said sealing means relative to the other side of said sealing means, means defining a restriction in said flow path adjacent said one side of said sealing means and comprising a substantial portion of the length of said flow path, said restriction being effective upon the flow of fluid therethrough to create a pressure drop thereacross, thereby to reduce the fluid pressure adjacent said one side of said sealing means, whereby said sealing means upon opening a flow path of greater cross section than said restriction means, is caused to return to its normally closed position, further comprising said valve members being mounted for relative movement, and means normally biasing said valve members to a first position relative to each other and effective to seal off said flow path, said valve members adapted, in response to an increase in fluid pressure on one side of said valve relative to the fluid pressure on the other side of said valve, to move away from each other to a second relative position effective to open said flow path, wherein said means for defining said flow path includes aperture means in at least said first valve member, said restriction being defined at least in part by said aperture means, further comprising a third valve member extending from and movable with said second valve member, said aperture in said first valve member adapted to receive said third valve member forming an annular clearance between said aperture and said third valve member, said annular clearance defining said flow path restriction.

12. The control valve of claim 11 wherein said stop means extends from and is movable with said third valve member.

13. The control valve of claim 11 further comprising fluid cutoff means operatively connected to said third valve member and adapted to close off said restriction when said first and second valve members move away from each other a predetermined distance.

14. A control valve for maintaining the pressure of the fluid on one side of said valve substantially at the same level as the pressure of the fluid on the other side of said valve, comprising valve support means, first and second valve members supported by said valve support means and movable relative thereto and relative to each other, said valve members defining a flow path for the flow of fluid through said valve, means normally biasing said valve members to a first position relative to each other effective to seal off said flow path, said valve members being adapted in response to an increase in fluid pressure on the other side of said valve to move relative to each other to a second relative position effective to open said flow path, means for allowing said valve members to move together a substantial distance in response to said increase in fluid pressure on one side of said valve, and stop means effective to stop the movement of one of said valve members after said movement together a substantial distance, whereby the other of said valve members continues its movement relative to said support and moves relative to said one valve member to said second relative position, thereby to open said fluid path, further comprising fluid cutoff means adapted to cut off the flow of fluid through said valve when said first and second valve members move away from each other, a predetermined distance.

15. A control valve for maintaining the pressure of a fluid on one side of said valve substantially at the same level as the pressure of the fluid on the other side of said valve, comprising a housing, a first valve member sealingly and slidably mounted on said housing and urged by first spring means, against said housing in a first direction, a second valve member sealingly and slidably mounted on said first valve member and urged by second spring means toward and into engagement with said first valve member in a second direction opposite to said first direction, said housing having first aperture means on said one side of said valve for providing fluid communication between said first valve member and the fluid on said one side of said valve and having second aperture means on the other side of said valve for providing fluid communication between said second valve member and the fluid on said other side of said valve, said first and second valve members being provided respectively with third and fourth aperture means, sealing means carried by one of said valve members and normally operatively engaged by the other of said valve members between said third and fourth apertures for sealing off a flow path therebetween, and plug means extending from said second valve member in said second direction and received within and extending through and beyond said third aperture means, the extended portion of said plug means adapted to engage said housing, the clearance between said plug means and said third aperture means defining a restricted flow path whereby upon the increase in relative fluid pressure on said one side of said valve, said second valve member is urged to move in said first direction away from said first valve member to separate said sealing means from said other of said valve members, and whereby upon the increase of relative fluid pressure on said other side of said valve, said first and second valve members are urged to move together in said second direction until said plug means engages said housing, whereupon said second valve member remains stationary with respect to said housing and said first valve member continues its movement in said second direction, again to separate from said other of said valve members.

16. The control valve of claim 15 wherein said plug member is tapered inwardly on a portion of its surface remote from said second valve member, whereby as said valve members move away from each other, said flow restriction defined by said clearance between said plug and said third aperture means is progressively widened.

17. The control valve of claim 16 wherein said sealing means comprises a single valve seat formed on said second valve member and a gasket operatively connected to said first valve member adjacent to and surrounding said third aperture means.

18. The control valve of claim 15 wherein said sealing means comprises a single valve seat formed on said second valve member and a gasket operatively connected to said first valve member adjacent to and surrounding said third aperture means.